June 18, 1963  R. J. MOLYNEAUX ET AL  3,094,250
LIQUID-DISPENSING APPARATUS
Filed Nov. 17, 1960  2 Sheets-Sheet 1
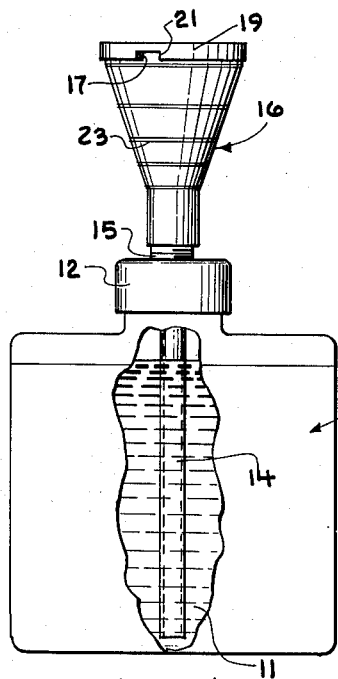
FIG. 1
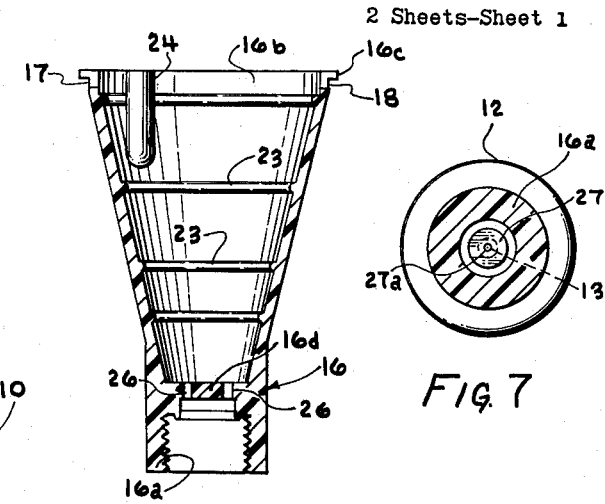
FIG. 2
FIG. 7
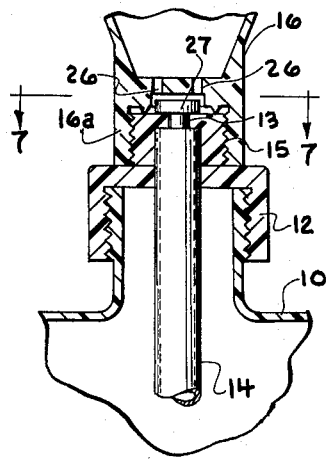
FIG. 6
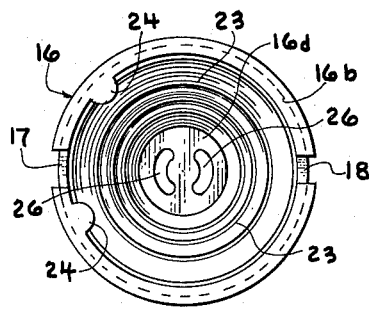
FIG. 3
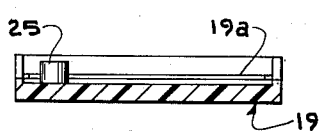
FIG. 5
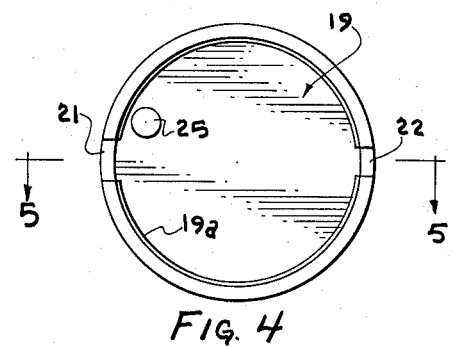
FIG. 4
INVENTORS
ROBERT J. MOLYNEAUX
DAVID E. GOLDICH
BY Ooms, McDougall,
Williams & Hersh
ATT'YS.

June 18, 1963
R. J. MOLYNEAUX ET AL
3,094,250
LIQUID-DISPENSING APPARATUS
Filed Nov. 17, 1960
2 Sheets-Sheet 2
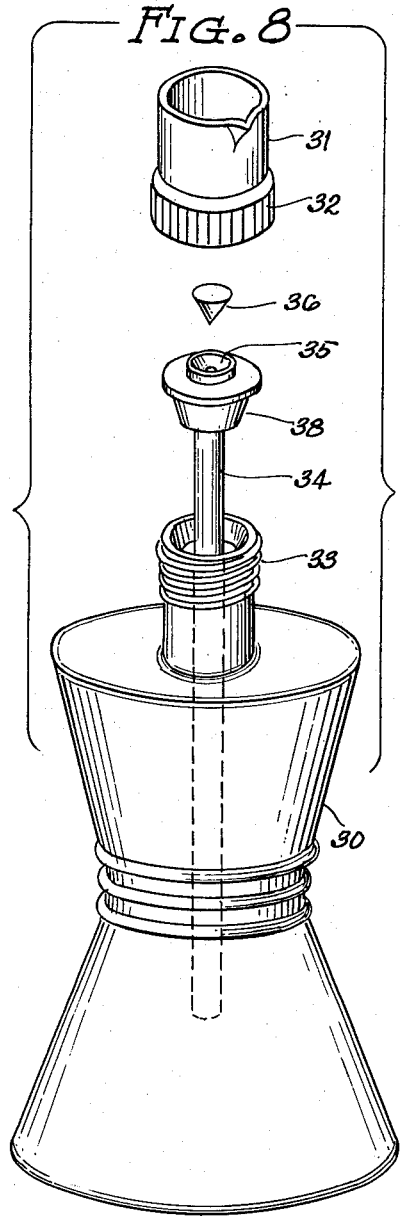
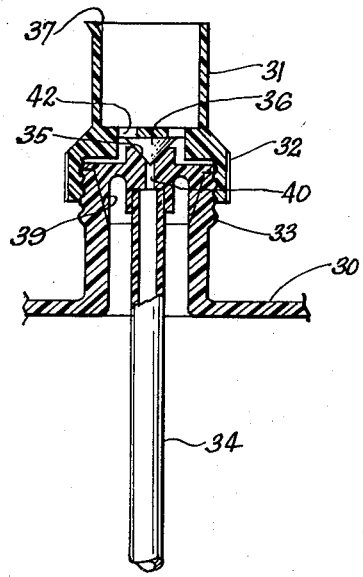
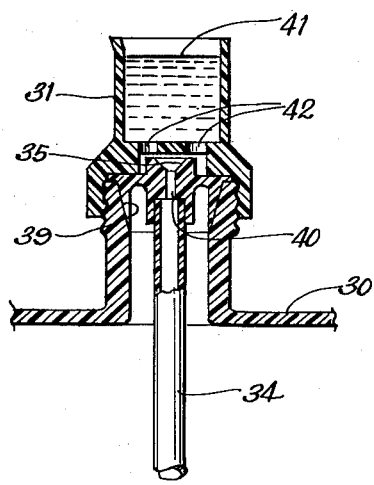
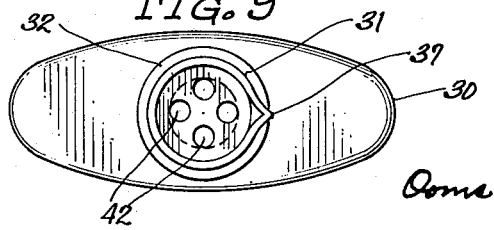
INVENTORS
Robert J. Molyneaux
and David E. Golich
BY
Ooms, McDougall, Williams & Hersh
Attorneys United States Patent Office  3,094,250
Patented June 18, 1963

3,094,250
LIQUID-DISPENSING APPARATUS
Robert J. Molyneaux, Chicago, and David E. Goldich, Lake Forest, Ill., assignors to The Permalux Company, Aurora, Ill., a corporation of Illinois
Filed Nov. 17, 1960, Ser. No. 70,025
2 Claims. (Cl. 222—207)

This invention relates to the dispensing of liquids. It is particularly addressed to a novel combination which includes a manually deformable main container and a special closure member therefor which permits accurate dispensing of liquid from the container in metered quantities without necessity for intermediate pouring operations and with wide latitude as to the size of the metered quantities dispensed.

This application is a continuation-in-part of application Serial No. 858,079, filed December 8, 1959, now abandoned.

Our invention finds particular utility in those frequently encountered applications wherein it is desirable to dispense metered amounts of a liquid from a portable container but wherein the use of permanently installed dispensing machinery is inconvenient. Our invention has the great advantage in such applications that it permits convenient manual dispensing with a high degree of accuracy while employing only low-cost components. Indeed, the cost of the dispensing apparatus of the present invention may in many cases be so low in proportion to the value of the liquid dispensed thereby as to permit the dispensing apparatus to be sold as an integral "package" with the liquid and hence be thrown away when the contents of the dispensing apparatus have been exhausted.

An additional embodiment of this invention presents the advantage of permitting packaging of the device as a unit wherein no substantial steps need be resorted to in assembling the apparatus for use.

Thus an important object of the present invention is to provide a liquid-dispensing apparatus of the so-called "squeeze bottle" type, wherein the metering of liquid to be dispensed is accomplished by internal pressure in the container, with resulting upward movement of the liquid into a calibrated dispensing cap, such pressure being produced by deformation of the plastic or metal container.

A further object of the invention is to provide a dispensing apparatus of which the calibrated cap and associated components may conveniently be packaged with the basic deformable container and, on being assembled for use, may be kept in assembled form and used periodically until the contents of the container have been exhausted, meanwhile affording to the contents effective protection from access to air and other contamination.

A still further object of the invention, as previously noted, is to provide an accurate means of dispensing liquids manually in metered quantities with components of such simplicity and low cost as to make the dispensing apparatus economically expendable when its liquid contents have been used up.

An additional object of this invention comprises the production of an apparatus wherein the transfer of liquid from a container to a dispenser may be accomplished in a smooth and controllable manner.

A still further object of this invention is the production of a device which may be transported in a state substantially as it is to be used, thereby eliminating the necessity for packaging extra parts and the necessity of difficult assembly operations.

Other objects and advantages of the invention will be apparent from the following detailed description of typical embodiments thereof.

In the appended drawings, FIG. 1 is a side elevation view, partly cut away, showing a typical dispensing apparatus in accordance with the present invention. FIG. 2 is a view in vertical section of the calibrated dispensing cap which forms an important part of the invention, the cover portion thereof having been removed. FIG. 3 is an elevation view of the dispensing cap of FIG. 2, again with the cover removed. FIG. 4 is a plan view, from the under side, of the protective cover which is normally associated with the dispensing cap of FIG. 2. FIG. 5 is a view in diametric cross-section of the protective cover of FIG. 4, the section being taken along the line 5—5 of FIG. 4. FIG. 6 is a fragmentary view in section of the throat or neck portion of a dispensing apparatus embodying our invention, the detailed structure in FIG. 6 being illustrative of an alternative embodiment of the invention. FIG. 7 is a sectional view of an apparatus similar to that shown in FIG. 6, taken in horizontal section along the line 7—7 of FIG. 6 and showing a further optional modification of the FIG. 6 structure. FIG. 8 is an exploded view of an additional embodiment of this invention. FIG. 9 is an elevation view of the dispenser shown in FIG. 8. FIG. 10 is a cross-section taken about the diameter of the device shown in FIG. 8, and represents the device as assembled for shipping. FIG. 11 is a cross-section substantially the same as that in FIG. 10, but shows the device as it appears in use.

Referring now to FIG. 1, we show therein a container 10 which is liquid tight and made of a readily deformable material such as polyethylene plastic. Containers of this type are well known and are widely used in present-day commerce, their most common application perhaps being in connection with cosmetic liquids such as shaving lotion, liquid deodorant and the like. The container 10 is indicated as being substantially filled with a liquid 11 which may be any substance of which controlled dispensing in metered quantities is desired. Illustrative of the liquids with which our invention has particular utility are liquid detergents and chemical additives which in normal use are poured in small metered quantities into larger containers such as gasoline tanks, processing vats, and the like.

Container 10 is provided with a primary closure member 12 which has a central aperture 13. (See FIG. 6.) The lower end of aperture 13 is enlarged to receive snugly the upper end of a flexible plastic hose 14, the lower end of which extends into the interior of container 10 and terminates at or near the bottom of the container 10, both ends of hose 14 being open to permit passage of liquid therethrough.

Centrally disposed on the upper surface of the primary closure member 12 is a threaded boss 15. Boss 15, in the assembled invention, serves as the support for the dispensing cap 16 presently to be described in detail. Preferably, the primary closure member 12, including the boss 15, is made of a relatively rigid material such as a thermosetting plastic. The dispensing cap 16 is provided at its lower end with a cylindrical extension 16a, the entire cap being preferably formed of a somewhat flexible and resilient plastic such as polyethylene. For most applications, the inner wall of the extension 16a may be smooth in contour, as shown in FIG. 2, the extension 16a being simply pressed over the boss 15 and frictionally held thereon. Alternatively, if desired, suitable threads may be formed in the inner wall of the extension 16a to permit the dispensing cap 16 to be screwed in place on the boss 15. This alternative arrangement is shown in FIG. 6 and, as will presently be explained, is particularly desirable in the form of the invention shown in that figure.

When our invention is sold as an integral packaged combination including a filled bottle or container 10, it will usually be desirable to ship the container 10 with a rigid threaded temporary cap (not shown) screwed over boss 15 and closing off the upper end of aperture 13 until use of the liquid is desired. Customarily, the dispensing cap 16 and its associated components will be enclosed with the container 10 in a sealed paper box or other outer container. As will be shown hereinafter, the need for packing additional elements may be dispensed with in one particular embodiment.

When the apparatus is being prepared for its first use, the temporary cap above-mentioned is removed and in its place dispensing cap 16 is pressed or screwed onto boss 15, as shown in FIGS. 1 and 6.

Dispensing cap 16 is fashioned generally in the form of a funnel having an open upper rim 16b. Rim 16b, in the embodiments illustrated, contains a pair of diametrically opposed recesses or notches 17 and 18, of sufficient size to permit passage of liquid therethrough. The open end of the dispensing cap 16 is normally closed off by a cover member 19, which may also be made of a suitable flexible plastic such as polyethylene. Cover 19 has a depending rim adapted to latch over the open top of dispensing cap 16. To facilitate secure lodgment of the cover 19 over the dispensing cap 16, the cap 16 may be provided at its upper edge with an outwardly extending lip 16c, and the cover member 19 may be provided with an inwardly extending lip 19a, adapted to snap over the lip 16c and mate snugly therewith.

The cover member 19 is provided with a pair of diametrically disposed recesses or notches in its depending rim, such notches being designated by the numerals 21 and 22.

The inner surface of the dispensing cap 16 is provided with any desired number of internal ribs 23, spaced in such manner as to define the metered quantities of liquid most frequently dispensed. If desired, numerals or words may be marked into the inner or outer wall of the cap 16 to identify the quantities of liquid associated with each of the ribs 23. Thus, the lowermost of the ribs 23 might be situated at a level representing ½ oz. of liquid contents in the dispensing cap, the next higher might be located at the 1 oz. level, the next higher at the 2 oz. level, and so on. The positioning and the marking of the ribs 23 will of course depend on the particular application for which the dispensing cap is designed.

Near the upper rim of the dispensing cap 16, and disposed on its inner wall, we provide a pair of bosses 24 which are molded integrally with the cap and disposed at suitable angular spacing from the recess or notch 17. The under surface of the cover member 19 is provided with an integral stud or projection 25, situated near the rim of the cover and disposed angularly near the notch or recess 21.

The relative positions of the bosses 24 and the stud 25 are chosen so that they cooperatively act as stop members limiting rotation of the cover member 19 relative to the dispensing cap 16. As may be seen by examination of FIGS. 3 and 4, maximum counter-clockwise rotation of the cover 19 relative to the cap 16 will bring the notches 21 and 17 into alignment, at the same time bringing notches 18 and 22 into alignment. In this position, the aligned notches provide continuous passages from the interior of the dispensing cap 16 to the atmosphere and permit liquid contained in the dispensing cap 16 to be poured out through one of the passages, air being simultaneously admitted through the other passage.

When, on the other hand, the cover 19 is rotated fully clockwise, so that the stud 25 abuts the other boss 24, the notches 21 and 22 are out of alignment with the notches 17 and 18, with the result that the dispensing cap is wholly closed.

The bottom of the funnel portion of dispensing cap 16 is closed off by a wall or bulkhead 16d, relieved, however, by a pair of openings 26 which provide liquid communication between the funnel portion of dispensing cap 16 and the interior of the cylindrical extension 16a which fits over boss 15 on primary cap 12. The part of bulkhead 16d between the openings 26 defines a baffle that directly overlies the upper end of passage 13.

In the embodiment of our invention shown in FIG. 2, the openings 26 provide a liquid passage between the upper end of the central aperture 13 in cap 12 and the interior of the funnel portion of dispensing cap 16. The baffle action of the wall 16d insures that liquid flow into cap 16 will be free from violent jets or squirting effects.

In the alternative embodiment of the invention shown in FIGS. 6 and 7, a leaf valve member 27 is disposed in the space between the wall 26 and the upper surface of boss 15, the clearance between those members being slightly greater than the thickness of valve member 27. The leaf valve element 27 may be either imperforate as shown in FIG. 6, or, if desired, it may be provided with a small central aperture 27a, as shown in FIG. 7.

The embodiment shown in FIGS. 8–11 consists of a container 30 of the same material as previously described, and a dispensing cap 31 with a pouring lip 37. The dispensing cap has an enlarged threaded portion 32 adapted to fit about the threaded neck 33 of the container 30. A flexible plastic hose 34 is employed, the hose terminating in an enlarged portion 38. The portion 38 has a recessed portion 35 which will receive a tapered closure element 36. The use of the closure element will be explained hereinafter. The dispensing cap 31 has a base portion with apertures 42 formed therein. The portion 38 at the end of the flexible hose 34 is constricted as shown at 40. As will be hereafter discussed, the liquid will pass through the flexible hose 34, the throat 40, and the apertures 42 into the dispensing cap 31.

In describing the operation of our invention, we shall first assume that the entire combination has been assembled in the manner shown in FIG. 1, with the dispensing cap 16 securely pressed or screwed onto the boss 15 and with the cover member 19 snapped into place on the upper rim of dispensing cap 16.

First of all, let it be noted that when the assembly is thus completed and the cover 19 is rotated to its closed position, the liquid 11 in container 10 is fully protected from contamination, leakage, or evaporation, and the container 10 may be stored indefinitely in that condition.

When dispensing of liquid from the container 10 is desired, the cover member 19 is first rotated to its open position as previously described, the apparatus is held in the customary vertical position where the side of the dispensing cap 16 is readily visible to the user, and the walls of the container 10 are squeezed. The resulting increased pressure within the container 10 will force the liquid 11 upwardly through the hose 14, the aperture 13, and the openings 26 into the interior of dispensing cap 16. This squeezing process is continued until the level of the liquid in the dispensing cap 16 has reached the level desired, the operator of course being aided in this determination by the calibrating or metering ribs 23. When the desired quantity of liquid has been thus introduced into the dispensing cap 16, the container is then turned so as to pour the liquid through one of the openings provided by the aligned notches 17, 21 and 18, 22. The liquid will readily flow through the selected opening, since air will at the same time enter through the other opening.

In the simplest form of our invention, as shown in FIG. 2, the user will maintain the manual pressure on the container 10 while the contents of the dispensing cap 16 are being poured out. By thus holding the pressure constant, the user will insure that none of the liquid can flow back into the container 10 and at the same time will be certain that only the desired quantity of liquid is poured out, since no more liquid will flow upward into the dispensing cap unless additional pressure is applied to the container 10.

If in squeezing on the container 10 to force liquid into the dispensing cap 16, the user supplies a greater amount of the liquid than he desires to dispense, he simply releases pressure on the container 10 to a sufficient extent to lower the liquid level in the dispensing cap 16 to the desired value, after which the contents are poured out as above described.

In the alternative embodiments of our invention shown in FIGS. 6 and 7, the valve member 27 makes it unnecessary for the user to maintain constant manual pressure on the container 10 during the pouring operation. Thus, in the FIG. 6 embodiment, the valve 27 will close against the upper end of aperture 13 the instant pressure on the container 10 is released, and back-flow of the liquid from the dispensing cap 16 into the container 10 is thus prevented. This permits metering of the desired quantity of liquid by the squeezing method already described, after which the user can release pressure on the container 10 and pour the contents of the dispensing cap 16 with confidence that the precise quantity desired is being dispensed.

The entirely imperforate valve arrangement shown in FIG. 6 will not permit liquid to flow back from the dispensing cap 16 into the container, with the result that, if too much liquid is forced into the dispensing cap by the operator, it may be necessary to pour out to waste some of the liquid in order to reduce the level below the desired value and hence enable the used to achieve the desired metered quantity by further squeezing. This may be undesirable in some applications where the contents of the container are quite valuable. In many cases, therefore, the best form of the invention is that shown in FIG. 7, wherein the valve member 27 is provided with a small aperture 27a, permitting a slow re-flow of the liquid from the dispensing cap back into the container 10. In this form of the invention, the dispensing cap 16 can be filled to any desired level rapidly, since the valve member 27 is unseated whenever the container 10 is squeezed. When the desired level has been achieved, pressure on the container can be released and the liquid quickly poured from the dispensing cap 16 into the tank or other container for which it is destined. If this operation is performed quickly, the re-flow into the container 10 through the small aperture 27a will be negligible. If, on the other hand, the user has inadvertently forced too much liquid into the dispensing cap, he can release the pressure on the container 10, allow the liquid to flow slowly back into the container 10 until the desired level is reached in the dispensing cap 16, and then quickly pour out its contents. Thus, with the FIG. 7 embodiment of the invention, accurate metering can always be obtained without any wastage of the liquid contents of the container 10.

In the use of the device shown in FIGS. 8–11, the operating principles are substantially the same as described with reference to the other embodiments. This embodiment, however, has the advantage of eliminating the need for a separate closure cap which obviously facilitates the use of the device upon receipt at the place of use. In describing the operation of this embodiment, the container 30 is first filled up with the desired fluid 41. The device is then closed by inserting the hose 34 with the enlarged portion 38 seating at 39, as shown in FIG. 11. The tapered closure member 36 is then inserted in the recessed portion 35 and the portion 32 is then fitted about the neck 33. As can be seen in FIG. 10, the base portion of the dispensing cap 31 forces the closure element 36 into tight engagement with the surfaces of recessed portion 35.

The device may then be shipped without any danger of loss of the fluid. Upon receipt, it will be a simple matter to remove the closure element 36, replace the dispensing cap 31, and thus provide a usable assembly.

In connection with the embodiment shown in FIGS. 8–11, it is well to note that the graduation lines 23 may be employed with respect to the dispensing cap 31. Likewise, the embodiment including the members 27 and 27a, disclosed in FIGS. 6 and 7, may easily be incorporated into this device. Also, the cap member 19 and its corresponding features may be employed in lieu of a pouring lip 37.

While we have in this specification described in considerable detail certain typical embodiments of our invention, it should be understood that these are merely illustrative and that many departures from the specific structure shown may be made by persons skilled in the art without departing from the spirit of our invention. It is therefore our desire that the scope of our invention be determined primarily by reference to the appended claims.

We claim:

1. Dispensing apparatus for liquids comprising in combination a manually deformable air-tight container adapted to store liquid and having liquid exit means in one portion thereof, a dispensing cap mounted on the container over said exit means, said cap having a hollow interior portion adapted to receive liquid and marked to indicate at least one level therein representing a predetermined quantity of liquid contents, said cap being formed to define a restricted air-tight liquid passage between said interior portion and the exit means of said container, whereby manual compressive pressure on said container will force liquid from said container into the lower part of said cap interior, and a valve located in said restricted liquid passage, said valve unseating when liquid is forced through said passage due to compressive pressure on said container but seating when pressure on said container is relieved, said valve being provided with a small opening operative when the valve is seated to permit very slow back-flow from said cap interior into said container.

2. Dispensing apparatus for liquids comprising in combination a manually deformable air-tight container adapted to store liquid and having liquid exit means in one portion thereof, a dispensing cap mounted on the container over said exit means, said cap having a hollow interior portion adapted to receive liquid and marked to indicate at least one level therein representing a predetermined quantity of liquid contents, said cap being formed to define a restricted air-tight liquid passage between the lower part of said interior portion and the exit means of said container, whereby manual compressive pressure on said container will force liquid from said container into said cap interior, a valve located in said restricted passage, said valve unseating when liquid is being forced through said passage by compressive pressure on said container but seating when pressure on said container is relieved, and a removable cover member for said cap, said cover being rotatably mounted on said cap and being manually movable between a closed position and an open position, said cap and cover being conjointly operative in said closed position to close off the cap interior from access to atmosphere, protecting the liquid contents of the container from contamination, leakage, and evaporation, and said cap and cover being conjointly operative in said open position to define openings providing means for egress of liquid from said interior portion and simultaneously entry of air thereinto, said valve being provided with a small opening operative when seated to permit very slow back-flow of liquid from said cap interior into said container when said cover is in said open position.

References Cited in the file of this patent

UNITED STATES PATENTS

| | | |
|---|---|---|
| 1,435,331 | Pasco | Nov. 14, 1922 |
| 2,545,350 | Fuld | Mar. 13, 1951 |
| 2,603,387 | MacPhee | July 15, 1952 |
| 2,626,606 | Campbell | Jan. 27, 1953 |
| 2,714,975 | Greene | Aug. 9, 1955 |
| 2,717,727 | Robb | Sept. 13, 1955 |
| 2,737,327 | Bolsey | Mar. 6, 1956 |
| 2,744,663 | White | May 8, 1956 |
| 2,761,833 | Ward | Sept. 4, 1956 |
| 2,957,501 | Holmes | Oct. 25, 1960 |